Feb. 4, 1958   R. D. ABELE   2,822,200
QUICK DETACHABLE HEAD
Filed Dec. 16, 1955
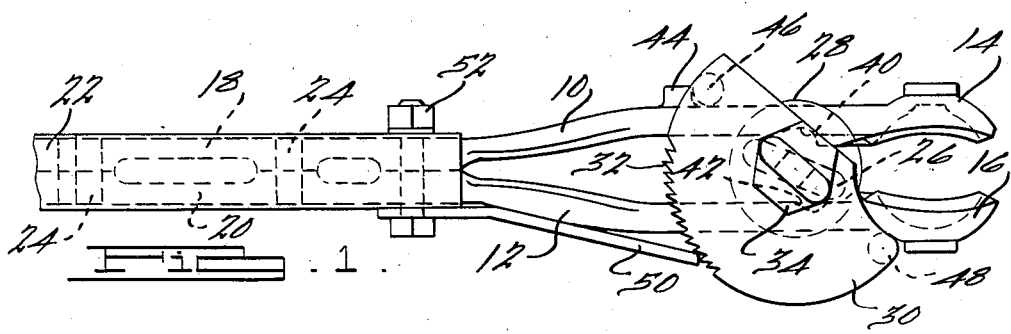
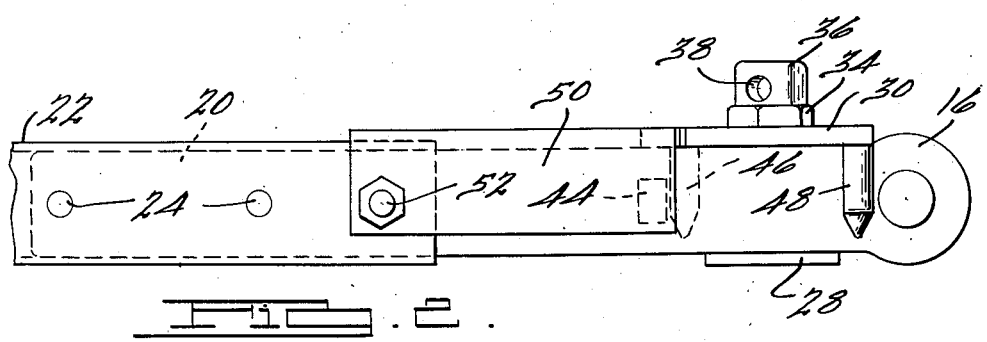
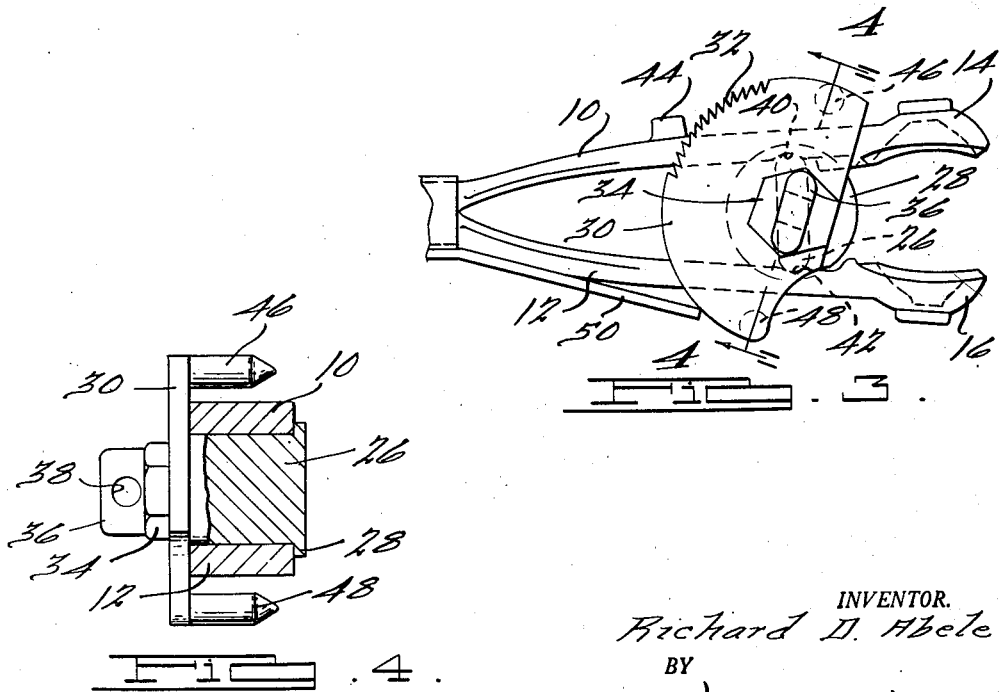
INVENTOR.
Richard D. Abele
BY
Maxwell K. Murphy
ATTORNEY

United States Patent Office 2,822,200
Patented Feb. 4, 1958

2,822,200

QUICK DETACHABLE HEAD

Richard D. Abele, Zanesville, Ohio, assignor to Detroit Harvester Company, Detroit, Mich., a corporation of Michigan Application December 16, 1955, Serial No. 553,471

1 Claim. (Cl. 287—89)

This invention relates to improvements in pitman heads for mowing machines and particularly to a pitman head which may be quickly and easily attached and detached by the use of simple tools.

During operation of a mowing machine over an extended period, such as a day, the knife tends to become dull. Most operators prefer to change knives rather than take the time to sharpen the knife on the machine because of the saving of time, and usually several sharpened knives are carried along on a day's run for this purpose.

Heretofore, in order to change knives, it has been necessary to use a large wrench in conjunction with a bar in order to loosen the fastenings and spread the socket straps, and considerable time was required to make the change. Then, too, wrenches and other tools tend to become lost or misplaced and are frequently not available when needed.

It is the object of my invention to provide an improved mower pitman head which is easily and readily detachable in the field with a simple tool and which is adjustable to accommodate varying sizes of knife ball-connectors.

In the drawings:

Fig. 1 is a plan view of my improved pitman head;
Fig. 2 is a side elevation thereof;
Fig. 3 is a view similar to Fig. 1 showing the socket straps in open or spread position; and
Fig. 4 is a section along the line 4—4 of Fig. 3.

My improved pitman head comprises a pair of straps 10, 12, of forged spring steel or other suitable material, having their outer ends 14, 16, suitably formed to provide a socket for reception of the ball commonly provided at the inner end of a mower knife (not shown). The straps have elongated rear ends 18, 20, of rectangular cross-section which are inserted in the pitman 22 and fastened therein by rivets 24.

The locking and spreading assembly for the straps comprises a cam 26 provided at its lower end with an integral round flange 28 and at its upper end with an enlarged semi-circular flange 30. The flange 30 is provided with a set of latch teeth 32, the purpose of which will be explained below.

The upper flange 30 is attached to the cam 26 by means of a hexagonally headed bolt 34 which has an integral lug 36 provided with a hole 38 on its topside.

As may be seen from Figs. 1 and 3, the straps 10 and 12 are provided with grooves 40 and 42 respectively, which grooves are engaged by the cam 26. A lug 44 is formed on the outer side of strap 10, which lug is adapted to act as a stop for the pin 46 carried by the flange 30. Another pin 48 carried by the flange on the side adjacent the strap 12 is adapted to engage the socket portion 16 of the strap when the straps are in closed position.

A spring latch element 50 is secured to the assembly by a bolt 52 which also reinforces the attachment of the head to the pitman.

The device operates as follows:

In Fig. 1, the parts are shown in closed position, and in use, the ball connector portion of a reciprocating knife or sickle would be engaged in the socket between the ends 14, 16, of the straps 10, 12. The flange 30 is latched in closed position by engagement of the latch element 50 with the latch teeth 32, the cam 26 is in inoperative position and the pins 46, 48, are engaged with the outer surfaces of the straps thereby holding them against spreading. It will be noted from Fig. 4 that the flanges 28 and 30 are always engaged with the top and bottom surfaces of the straps, thus retaining the parts in assembled relation at all times.

When it is desired to change knives, the operator inserts a screw driver or round metal bar (which may be hung or clipped to the mowing machine such that it is always available) through the hole 38 and disengages the latch element 50 from the teeth 32. The latch 50 may be disengaged and held in disengaged position by the fingers. The cam assembly then may be rotated in a clockwise direction and the rounded side portions of the cam 26 will engage the grooves 40 and 42 and spread the straps apart to the position shown in Fig. 3. The knife ball is then readily removable from the socket.

When a newly sharpened knife is mounted on the mower, the ball end is disposed between the strap ends 14, 16, and the cam assembly rotated counterclockwise until desired pressure is produced on the ball through engagement of the pins 46, 48, on the outer surfaces of the straps, the latch element 50 functioning automatically to retain the cam in selected position.

The teeth or serrations 32 permit the cam to be locked in various positions, thereby making it possible to adjust the clearance between the knife ball and the socket in accordance with mowing conditions, wear in the parts, type of lubricant used, etc.

I claim:

A pitman head for mowers comprising a pair of pitman straps having socket portions at their outer ends, a cam assembly carried by the straps, said cam assembly including a flat portion adapted to overlie said straps and a cam portion disposed between said straps whereby rotation of said cam in one direction will spread said socket portions, a lug carried by one of said straps, pins carried by said flat portion depending therefrom outwardly of said straps and respectively adapted to engage said lug and one of said socket portions thereby to urge said straps to closed position in response to rotation of said cam in the opposite direction, a spring latch carried by one of said straps, and serrations in the edge of said flat portion adapted to be engaged by said latch whereby said cam assembly may be locked in selected positions.

References Cited in the file of this patent

UNITED STATES PATENTS

| | | |
|---|---|---|
| 698,934 | Gundry | Apr. 29, 1902 |
| 2,170,042 | Vutz | Aug. 22, 1939 |